(No Model.)
W. H. MANKEY & O. D. EASTMAN.
VALVE FOR MUSICAL INSTRUMENTS.
No. 462,148. Patented Oct. 27, 1891.
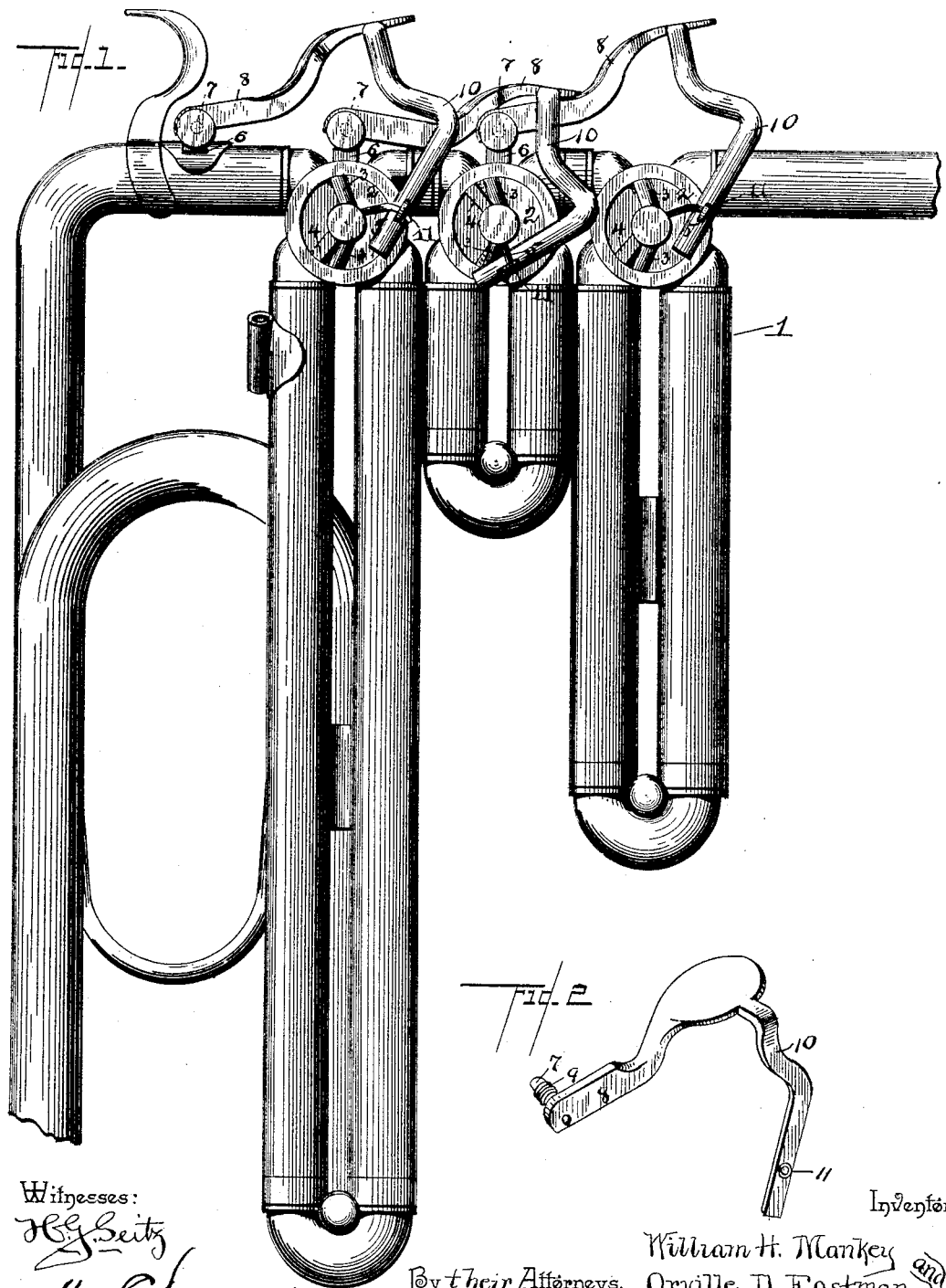

UNITED STATES PATENT OFFICE.

WILLIAM HENRY MANKEY AND ORVILLE DANIEL EASTMAN, OF CUBA CITY, WISCONSIN.

VALVE FOR MUSICAL INSTRUMENTS.

SPECIFICATION forming part of Letters Patent No. 462,148, dated October 27, 1891.

Application filed April 16, 1891. Serial No. 389,162. (No model.)

*To all whom it may concern:*

Be it known that we, WILLIAM HENRY MANKEY and ORVILLE DANIEL EASTMAN, citizens of the United States, residing at Cuba City, in the county of Grant and State of Wisconsin, have invented a new and useful Valve for Musical Instruments, of which the following is a specification.

This invention relates to improvements in valves for musical wind-instruments of that class employing rotary valves; and the objects in view are to provide a simple and positive means for transmitting motion from the keys of the instrument to the valves and obtain a short action, thereby rendering the instrument especially adapted for rendering quick and difficult music.

Other objects and advantages of the invention will appear in the following description, and the novel features thereof will be particularly pointed out in the claim.

Referring to the drawings, Figure 1 is a side elevation of a portion of a wind-instrument, the valves of which are operated in accordance with our invention. Fig. 2 is a detail in perspective of one of the keys.

Like numerals of reference indicate like parts in all the figures of the drawings.

1 designates an ordinary wind-instrument provided with the valve-stems 2 of ordinary rotary valves, at each side of which is located the stops 3, between which oscillates the lug 4 of the valve-stem. From the valve-stem extends a curved pin 5, said pin being located at that side of the stem opposite to which is located the lug 4.

In suitable bearings 6 is mounted a transverse bearing-pin 7, upon which the key-lever 8 is pivoted, a coiled spring 9 serving to normally maintain the lever in an elevated position. From the lever depends an arm 10 having an eye 11 projecting therefrom near the lower end thereof, which eye receives loosely the curved pin 5 of the valve-stem.

Any number of valves may be employed—in this instance three—it of course being understood that the valve-operating mechanism is likewise increased in accordance with the valves.

The operation of the invention is as follows: By depressing a key-lever against the tension of its spring the arm 10 of said lever immediately communicates the motion to the bent pin of the stem of the valve, and as the arm is rigid and the pin curved the latter rides through the eye of the arm, oscillating the stem accordingly. It will be observed that by reason of the curvature of the pin and its loose connection with the arm 10 when said valve is opened and its stem rotated, so that its pin is at its lowermost position, the lowering of the arm moving upon the radius of its circle will be adjacent to the valve-stem, or at what will then be the upper end of the curved pin, so that the shortest movement is secured for the key-lever and the latter when released from the pressure of the finger immediately springs back to position, carrying with it the curved pin and valve-stem. In this manner the closing of the valve is almost instantaneous, and sharp quick notes may be successively and rapidly rendered, thus facilitating the rendition of difficult music.

Having described our invention, what we claim is—

In a wind-instrument of the class described, the combination, with the valve-stem having a curved pin extending therefrom, of a pivoted key-lever and an arm extending from the lever and having an eye through which the pin loosely passes and in which the pin is adapted to loosely ride, substantially as specified.

In testimony that we claim the foregoing as our own we have hereto affixed our signature in presence of two witnesses.

WILLIAM HENRY MANKEY.
ORVILLE DANIEL EASTMAN.

Witnesses:
D. N. SMALLEY,
GEORGE MCFARLANE.